K. KIEFER.
VALVE FOR LIQUIDS.
APPLICATION FILED MAY 12, 1904.

930,386. Patented Aug. 10, 1909.

Witnesses.

Inventor.

UNITED STATES PATENT OFFICE.

KARL KIEFER, OF CINCINNATI, OHIO.

VALVE FOR LIQUIDS.

No. 930,386.  Specification of Letters Patent.  Patented Aug. 10, 1909.

Application filed May 12, 1904. Serial No. 207,519.

*To all whom it may concern:*

Be it known that I, KARL KIEFER, a citizen of the United States, and resident of Cincinnati, in the county of Hamilton and State of Ohio, have invented new and useful Improvements in Valves for Liquids, of which the following is a specification.

The improvement consists of providing a valve seat that can be easily replaced, that is easily accessible for the purpose of inspecting and cleaning, admits of an unobstructed flow of the liquid, and of a new and improved motion for closing the valve.

My invention is illustrated in the accompanying drawing, of which—

Figure 1:
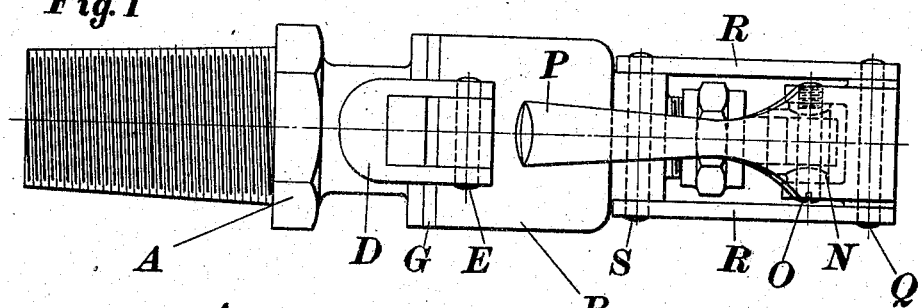
Figure 2:
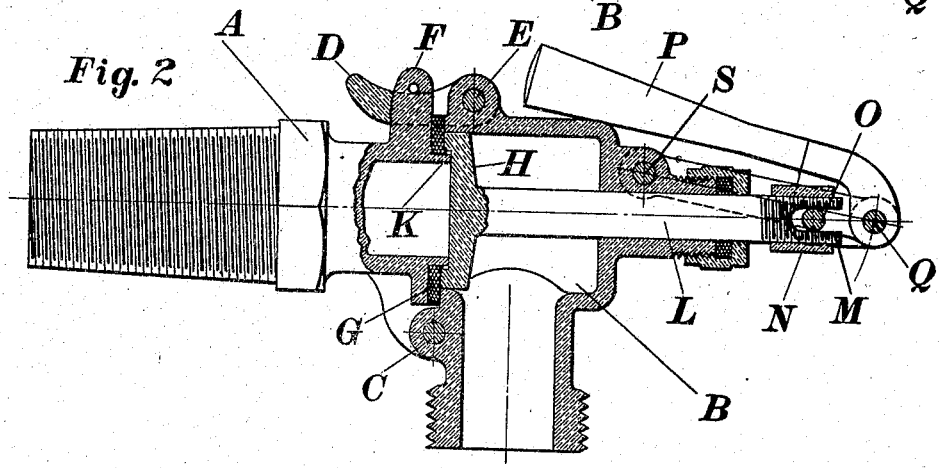
Figure 3:
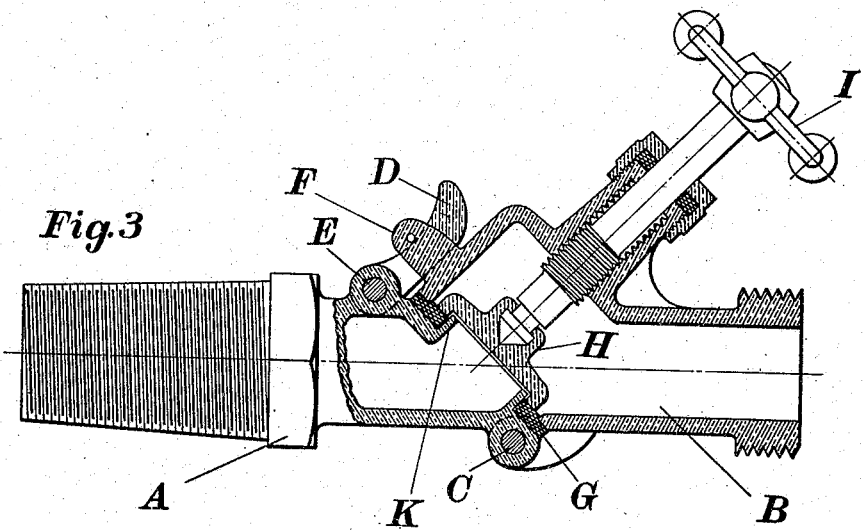

Figure 1 is a plan view, Fig. 2 is a vertical sectional elevation and Fig. 3 a vertical sectional elevation of a modified form of the valve.

I will explain the workings and arrangement of my invention by means of Fig. 3, being the most easily understood.

A is the valve body with a threaded portion to be secured to a cask or gas pipe, and is therefore, stationary.

B is that part of the valve having the outlet opening, which is shown as threaded to receive a coupling or any other pipe connection. B is connected to A by a hinge C and by a latch D, which is hinged at E, and works over a curved back boss F. To insure a tight fit of the part B against A, a ring-shaped gasket is interposed between said two parts, and the latch D is so arranged that when closed it compresses the gasket sufficiently to insure against any liquid passing through between parts A and B. My improved valve, however, is so arranged that this gasket H also serves as a seat for the valve piston, which may be seen from Fig. 3, where H is a piston that is actuated by means of a hand wheel I and forced against the gasket G.

In my valve I prefer to use a gasket of elastic material, such as rubber; it may however, consist of other elastic material. I have made provisions to prevent over-compression of the rubber by letting the piston H come to a stop against an annular metal projection K, when the gasket is compressed to about ⅔ of its original thickness. I have found that rubber compressed to not more than this thickness will not lose its elasticity so easily as when compressed to less than ⅔ of its original thickness.

In Figs. 1 and 2 is shown a quick motion for opening and closing the angle valve of my improved construction. L (Fig. 2) is a rod attached to piston H. It has a threaded part M, on which is screwed a nut N. Nut N is drilled and pin O, inserted in the bore, connects the valve stem L to lever P, forming a link connection with pin O. Lever P has a second pin Q parallel to pin O and connected by two connecting pieces R to a third pin S, which hinges on the part B. These three hinges form a toggle lever, whose workings are easily understood without further description. In order to regulate the force with which the piston H should seat against gasket G, pin O can be unscrewed, whereupon the nut N would be screwed up or down the piston rod L, half a turn at the time. The piston rod L is slotted at its upper end and allows for the adjusting movement of pin O.

What I claim as my invention and desire to secure by Letters Patent is:—

In a valve, the combination of a body part containing the seat, a casing hinged to the body part substantially in the plane of the seat and containing a valve, a gasket serving as a valve seat and simultaneously as a washer between the body part and the casing, and means for forcing and locking the valve upon its seat.

In testimony whereof I have signed my name to this specification in the presence of two subscribing witnesses.

KARL KIEFER.

Witnesses:
H. L. RAMLEAU,
G. W. WERDEN.